March 15, 1949. W. J. MORRILL 2,464,253
CONDENSER INDUCTION MOTOR CIRCUIT
Filed Sept. 16, 1946
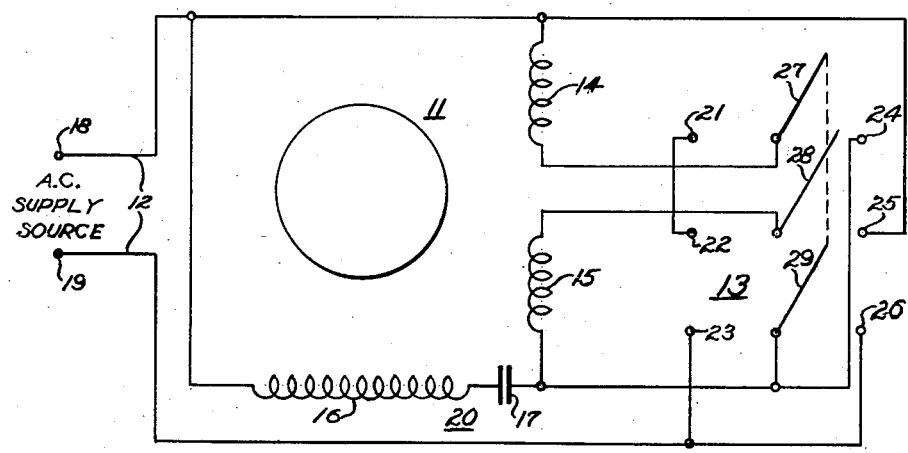
INVENTOR.
Wayne J. Morrill
BY
Hoodling and Krost
attys Patented Mar. 15, 1949

2,464,253

UNITED STATES PATENT OFFICE 2,464,253

CONDENSER INDUCTION MOTOR CIRCUIT

Wayne J. Morrill, Fort Wayne, Ind.

Application September 16, 1946, Serial No. 697,204

7 Claims. (Cl. 318—225)

My invention relates in general to electric motors, and more particularly to capacitor induction motors having a permanently split main winding.

An object of my invention is the provision of electrical connections to a three pole double throw switch to provide high and low speeds to a capacitor induction motor having two main windings and a starting winding circuit.

Another object of my invention is the provision of a method of connecting a three pole double throw switch with a neutral position to a capacitor induction motor having two main windings and a starting winding circuit to give high and low speed operations and an off position for the motor.

Other objects and a fuller understanding of my invention may be had by referring to the following description and claims, taken in conjunction with the accompanying drawing, in which the single figure is a schematic diagram showing the preferred embodiment of my invention.

My invention features a novel method of employing a standard three pole double throw switch to connect a capacitor induction motor to a potential source, wherein the switch provides for a high speed, a low speed, or an off position of the motor. Referring more particularly to the drawing, I show a capacitor induction motor 11 adapted to be connected through a three pole double throw switch 13 to a potential source 12. The motor 11 has a first main winding 14, a second main winding 15, and a starting winding 16. A condenser 17 is connected in series with the starting winding 16 to form a starting circuit 20, wherein the starting winding 16 is displaced in space phase from the main windings 14 and 15. The potential source 12 has a first terminal 18 and a second terminal 19. The three pole double throw switch 13 has first, second, third, fourth, fifth and sixth contactor points with reference numbers 21 through 26, respectively, and first, second and third contactor blades or bridgeable means with reference numbers 27, 28 and 29, respectively. The first main winding 14 is connected between the first terminal 18 and the first contactor blade 27. The second main winding 15 is connected between the second and third contactor blades 28 and 29, respectively. The starting circuit 20 is connected between the first terminal 18 and the third contactor blade 29. The first and second contactor points 21 and 22, respectively, are connected together. The fourth contactor point 24 is connected to the third contactor blade 29. The third and sixth contactor points are connected to the second terminal 19. The contactor blades 27, 28 and 29 of the switch 13 are co-acting; that is, they are ganged together. The blades of the switch 13 have a first position or operable circuit condition, a second position, and a neutral position. In the first position, the first, second and third contactor points 21, 22 and 23, respectively, are contactable or bridgeable by the first, second and third contactor blades 27, 28 and 29, respectively. In the second position, the fourth, fifth and sixth contactor points 24, 25 and 26, respectively, are contacted or bridged by the first, second and third contactor blades 27, 28 and 29, respectively. In the neutral position, the blades 27, 28 and 29 do not contact any contactor points, thus disconnecting the motor 11 entirely from the potential source 12.

In operation, when the switch 13 is thrown in the first position, the main windings 14 and 15 are connected in series across the potential source 12, and also the starting circuit 20 is connected across the potential source 12. This results in a low speed operation of the motor 11. When the switch 13 is thrown in the second position, the main windings 14 and 15 are connected in parallel across the potential source 12, and again the starting circuit 20 is connected across this potential source 12 to result in a high speed operation of the motor 11. When the switch 13 is thrown in the neutral position, both windings 14 and 15 and the starting circuit 20 are disconnected from the potential source 12. I am thus able to employ a standard triple pole double throw switch for turning the motor off, as well as for connecting the motor for either high speed or low speed operation. The arrangement of the electrical connections shown provides a motor for variable speed operation which is little, if any, more expensive to manufacture than the same motor would be if designed for single speed operation. By this novel arrangement, I am able to eliminate the customary transformer which has formerly been used to raise the voltage on the condenser and thus keep down the condenser size and cost, which at the same time furnished a means for controlling the speed of the motor. This omission of the transformer saves money and improves the efficiency of the motor circuit through the elimination of the transformer losses.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a capacitor induction motor having two main windings and a starting winding circuit, the provison of a three-pole double throw switch having a low speed, a high speed, and a neutral position adapted to connect said motor across a potential source, first connection means for connecting said windings and said circuit in parallel across said potential source when said switch is in said high speed position, and second connection means for connecting said starting circuit in parallel with said main windings connected in series and across said potential source when said switch is in said low speed position, said switch disconnecting said main windings and said circuit from said potential source when in said neutral position.

2. In combination with a potential source having first and second terminals, a capacitor induction motor having a first and a second main winding and a starting circuit including a starting winding in series with a condenser, a switch having first, second and third contactor blades, having first, second and third contactor points engageable, respectively, by said blades in a first position for operating the motor at low speed, and having fourth, fifth and sixth contactor points engageable, respectively, by said blades in a second position for operating the motor at a higher speed, first connection means for connecting said first main winding between the said first terminal and the said first contactor blade, second connection means for connecting the said main winding between said second and third contactor blades, third connection means for connecting the said starting circuit between the said first terminal and the said third contactor blade, fourth connection means for connecting the said first terminal to the said fifth contactor point, fifth connection means for connecting the said fourth contactor point to the said third contactor blade, sixth connection means for connecting said first and second contactor points together, and seventh connection means for connecting said second terminal to said third and sixth contactor points.

3. In combination with a potential source having first and second terminals, a capacitor induction motor having a first and a second main winding and a starting circuit including a starting winding in series with a condenser, a switch having first, second and third contactor blades, having first, second and third contactor points engageable, respectively, by said blades in a first position for operating the motor at low speed, and having fourth, fifth and sixth contactor points engageable, respectively, by said blades in a second position for operating the motor at a higher speed, said switch having a neutral position for disengaging said motor from the potential source, first connection means for connecting said first main winding between the said first terminal and the said first contactor blade, second connection means for connecting the said second main winding between said second and third contactor blades, third connection means for connecting the said starting circuit between the said first terminal and the said third contactor blade, fourth connection means for connecting the said first terminal to the said fifth contactor point, fifth connection means for connecting the said fourth contactor point to the said third contactor blade, sixth connection means for connecting said first and second contactor points together, and seventh connection means for connecting said second terminal to said third and sixth contactor points.

4. A multi-speed capacitor induction motor comprising a stator having two main windings and a starting winding, the latter being displaced from the main windings, a condenser in series with the starting winding and forming therewith a starting circuit, a potential source having a first and a second terminal, said first terminal being connected to one end of one main winding and one end of the starting circuit, said second terminal adapted to be connected by three-pole double throw switch means to one end of the other main winding and the other end of the starting circuit, and connections to said switch means associated with the main windings for connecting said main windings either in parallel or in series across the potential source, for a high speed and a lower speed, respectively, the starting circuit being adapted to be connected across the potential source by said switch means during the starting condition.

5. In combination with a potential source having first and second terminals, a capacitor induction motor having a first and a second main winding and a starting circuit including a starting winding in series with a condenser, switch means having first, second, third, fourth, fifth, sixth, seventh, eighth and ninth contactor points and having conversely operable bridgeable means adapted to have at least a first and a second operable circuit condition, said bridgeable means in the first circuit condition bridging from said first, second and third points to said seventh, eighth and ninth points, respectively, and in said second circuit condition bridging from said fourth, fifth and sixth points to said seventh, eighth and ninth points, respectively, first connection means for connecting said first main winding between said first terminal and said seventh point, second connection means for connecting said second main winding between said eighth and ninth points, third connection means for connecting the said starting circuit between the said first terminal and the said ninth point, fourth connection means for connecting the said first terminal to the said fifth point, fifth connection means for connecting the said fourth and ninth points together, sixth connection means for connecting the said third and sixth points to the said second terminal, and seventh connection means for connecting the said first and second points together.

6. In combination with a potential source having first and second terminals, a capacitor induction motor having a first and a second main winding and a starting circuit including a starting winding in series with a condenser, each of said main windings and said starting circuit having first and second ends, a common connection lead having first and second ends, first switch means for connecting said first end of said first main winding either to said first end of said common connection lead or to the second end of said second main winding, second switch means for connecting said first end of said second main winding either to said second end of said common connection lead or to said first terminal, third switch means for either connecting or disconnecting said second end of said second main winding to said second terminal, said first, second and third switch means being interlinked for simultaneous actuation, first connection means for connecting said first terminal to the second end of said first main winding and to said first end of said starting circuit, and second connection means for connecting the second end of said starting circuit to the second end of said second main winding.

7. In combination with a potential source having first and second terminals, a capacitor induction motor having a first and a second main winding and a starting circuit including a starting winding in series with a condenser, said starting circuit having first and second ends, first switch means having first and second contactor blades, having first and second contactor points engageable, respectively, by said blades in a first position for operating the motor at low speed, and having third and fourth contactor points engageable, respectively, by said blades in a second position for operating the motor at a higher speed, first connection means for connecting said first main winding between said first terminal and said first contactor blade, second connection means for connecting said second main winding between said second contactor blade and said first end of said starting circuit, third connection means for connecting the said second end of said starting circuit to said first terminal, fourth connection means for connecting the said first terminal to the said fourth contactor point, fifth connection means for connecting the said third contactor point to the first end of said starting circuit, sixth connection means for connecting said first and second contactor points together, and second switch means mechanically connected to and operable with said blades of said first switch means to provide connection between said second terminal and said first end of said starting circuit.

WAYNE J. MORRILL.

REFERENCES CITED

The following references are of record in the file of this patent:

UNITED STATES PATENTS

| Number | Name | Date |
|---|---|---|
| 1,886,895 | Meyer | Nov. 8, 1932 |
| 2,280,971 | Packer | Apr. 28, 1942 |